United States Patent [19]

Dodd et al.

[11] 4,361,683

[45] Nov. 30, 1982

[54] TERMINATION OF VINYL HALIDE POLYMERIZATION

[75] Inventors: John R. Dodd; Dean R. Weimer, both of Ponca City, Okla.

[73] Assignee: Conoco Inc., Ponca City, Okla.

[21] Appl. No.: 267,125

[22] Filed: May 26, 1981

[51] Int. Cl.³ .............................................. C08F 2/42
[52] U.S. Cl. .................................. 526/84; 526/344.2
[58] Field of Search ........................................... 526/84

[56] References Cited

U.S. PATENT DOCUMENTS

| | | | |
|---|---|---|---|
| 2,922,778 | 1/1960 | Rife | 260/45.95 |
| 2,960,496 | 11/1960 | Elder | 526/84 |
| 3,074,912 | 1/1963 | Blades | 260/45.95 |
| 3,409,583 | 11/1968 | Davis | 260/45.95 |
| 3,696,050 | 10/1972 | Werts | 260/45.95 |
| 3,812,086 | 5/1974 | Stack | 526/84 |
| 4,229,598 | 10/1980 | Weimer | 568/792 |
| 4,283,514 | 8/1981 | Weimer | 526/84 |

*Primary Examiner*—C. A. Henderson
*Attorney, Agent, or Firm*—Robin M. Dowling

[57] ABSTRACT

An improvement in the method of terminating the preparation of vinyl halide-containing polymers is disclosed. The improvement comprises injecting into the polymerization reactor at the desired level of conversion a free radical inhibitor obtained by the alkylation of p-methoxyphenol with nonene. The free radical inhibitor also functions as an antioxidant in the polymer product.

14 Claims, No Drawings

4,361,683

TERMINATION OF VINYL HALIDE POLYMERIZATION

BACKGROUND OF THE INVENTION

1. Field of the Invention

The invention is in the general field of improved methods of preparing polyvinyl-halide containing polymers (e.g. polyvinyl chloride).

2. General Background

The preparation of vinyl halide-containing polymers by suspension polymerization of vinyl halide either alone or in combination with other monomers is well-known. Briefly, the process comprises adding water, the monomer, initiator and suspending agent to the reaction vessel which is jacketed. The reaction mass is heated by injecting steam into the reaction vessel. Once at desired temperature the reaction is maintained at a predetermined temperature by controlling the temperature of the water in the jacket. The reaction is allowed to proceed until it reaches a predetermined conversion level. The reaction may be terminated by the addition of a free radical inhibitor (also known as a chain stopping agent). Usually, at the same time the reaction vessel pressure is reduced by venting usually to a compressor.

Alpha-methyl styrene (AMS) has been used for many years in the commercial production of polyvinyl chloride. Prior to the advent of steam stripping of the slurry to remove unreacted monomers, AMS was considered an effective terminating agent. However, at the higher temperature encountered with steam stripping AMS is not entirely satisfactory as a terminating agent. Presumably, the terminating reaction is reversible or some other adverse reaction is taking place. Accordingly, it would be desirable to have another material which is effective as a terminating agent.

Our invention is directed to a method of terminating polymerization of vinyl halide-containing polymers by the use of a material obtained by the alkylation of p-methoxyphenol with nonene. This material also functions an antioxidant in the product.

BRIEF SUMMARY OF THE INVENTION

Briefly stated, our invention is directed to an improvement in the method of terminating the preparation of vinyl halide-containing polymers wherein the improvement comprises injecting into the polymerization reactor at the desired level of conversion (75 to 90%) of monomer to polymer a free radical inhibitor obtained by the alkylation of p-methoxyphenol with nonene.

Described differently, our invention is directed to an improvement in the method of preparing vinyl halide-containing polymers by suspension polymerization wherein the improvement comprises terminating the polymerization reaction by injecting into the polymerization reactor at the desired level of conversion (75 to 90%) a free radical inhibitor obtained by the alkylation of p-methoxyphenol with nonene.

The free radical inhibitor also functions as an antioxidant in the polymer product.

DETAILED DESCRIPTION

The vinyl halide used in our invention preferably is vinyl chloride. However, other vinyl halides, such as vinyl bromide and vinyl fluoride, can be used. The invention will be illustrated using vinyl chloride.

Our invention is also suitable for use with mixtures of a vinyl halide and a monomer copolymerizable therewith. Examples of monomers which are copolymerizable with vinyl chloride include vinylidene chloride; vinyl acetate; vinyl alkyl esters (such as vinyl neodecanoate); ethylene; propylene; isobutylene; acrylonitrile; ester of acrylic and methacrylic acids such as methyl, ethyl, butyl, propyl, 2-ethylhexyl, hexyl acrylate and methoacrylate; esters of maleic acid such as diethyl, dipropyl, dihexyl, and dioctyl maleate.

Any of the initiators ordinarily used in the suspension polymerization of vinyl chloride can be used in our process. Examples of suitable initiators include organic peroxides such as benzoyl peroxide, lauroyl peroxide and diisopropyl peroxydicarbonate; azo compounds such as azobisisobutylronitrile; and the like oil-soluble catalysts.

Also, any of the suspending agents normally used in the suspension polymerization of vinyl chloride can be used in our process. Examples of suitable suspending agents include natural high molecular substances such as starch and gelatin, and synthetic high molecular substances such as partially saponified polyvinyl alcohol, methyl cellulose, ethyl cellulose, hydroxypropoxymethyl cellulose, maleic anhydride-vinyl ether copolymer and polyvinyl pyrrolidine and the like.

Inasmuch as there are many references (patents, books, encyclopedias, etc.) which teach the amounts of water, monomer, initiator and suspending agent, which are used in suspension polymerization processes, it is not believed necessary to describe suitable amounts herein.

The free radical inhibitor used in our process is obtained by the alkylation of p-methoxyphenol with nonene.

The nonene can be straight or branched-chain. Preferably, the nonene is the predominantly C-9 olefin mixture obtained by trimerization of propylene.

Inasmuch as alkylation processes are well-known it is believed that anyone skilled in the art can readily prepare the product used in our invention. However, in order to provide a more complete teaching a brief description will be provided of the alkylation process.

The relative amounts of nonene and p-methoxyphenol, based on p-methoxyphenol, are as follows, in parts by weight

|  | Suitable | Preferred |
| --- | --- | --- |
| Nonene | 0.7–4 | 1–2.2 |

The alkylation is carried out in the presence of a Friedel-Crafts catalyst. The term Friedel-Crafts catalyst is believed to be well understood in the art and refers to materials such as the aluminum halides, boron trifluoride, boron trichloride, sulphuric acid, antimony chlorides, stannic chloride, zinc chloride and mercuric chloride. Of the Friedel-Crafts catalysts aluminum chloride and boron trifluoride are preferred.

A suitable amount of alkylation catalyst, based on the p-methoxyphenol, is in the range of about 0.5 to about 7 percent by weight. Preferably, the amount of alkylation catalyst is in the range of about 1 to about 4 percent by weight.

The alkylation temperature which is employed can be in the range of about 25° C. to about 150° C., preferably from about 40° C. to about 95° C.

The alkylation reaction can be carried out either continuously or batchwise. In either procedure, effective contact time between the catalyzed reactants is in the order of about 1 to about 24 hours, preferably about 3 to about 12 hours. The time is dependent on a host of factors, including the amount of catalyst used, the ratio of reactants employed, temperature, etc.

The alkylation reaction product is then treated by conventional procedures to remove catalyst sludge, residual acidic components and impurities. After the purification treatment, the alkylate is treated (e.g. heated in vacuo) to remove substantially all of the unreacted nonene and p-methoxyphenol. Knowing that substantially all of the unreacted nonene and p-methoxyphenol are to be removed, any person skilled in the art can readily select a suitable temperature and pressure. A typical condition for removing most of the unreacted nonene and p-methoxyphenol is heating the crude mixture at about 35 mm (Hg) pressure and 80° C. for about 1 hour, followed by heating at 140° C. and 1-2 mm (Hg) pressure for about 1 hour.

The bottoms product contains above 90% (wt.) of nonyl-substituted p-methoxyphenol with most of the remainder being nonene and p-methoxyphenol. Of the nonyl-substituted p-methoxyphenol from about 25 to about 97 weight percent is mono-substituted with the remainder being di-substituted.

The amount of free radical inhibitor used expressed as parts per hundred parts of monomer is shown below.

| Suitable | Preferred |
|---|---|
| 0.01–0.10 | 0.02–0.04 |

In order to illustrate the nature of the present invention still more clearly the following examples will be given. It is to be understood, however, that the invention is not to be limited to the specific conditions or details set forth in these examples except insofar as such limitations are specified in the appended claims.

Examples 1-5 show the preparation of nonylated p-methoxyphenol products.

EXAMPLE 1 p-methoxyphenol (100 g, 0.805 mole) was charged to a 500 ml 3-neck flask equipped with a thermometer, addition funnel, mechanical stirrer, and heating mantle. The flask was heated to melt the p-methoxyphenol and then concentrated sulfuric acid (1.5 g) was added. Nonene (203 g, 1.608 mole) was added dropwise from an addition funnel to the stirred reaction mixture maintained at 70°-95° C. over a period of 7.5 hr. The resulting reaction mixture was stirred overnight at ~90° C.

The reaction mixture was cooled, washed with 2×500 ml of water, and then washed once with water (500 ml) plus sufficient caustic to bring the pH to 10. The reaction mixture was next washed with saturated sodium chloride solution and then dried over sodium sulfate.

The resulting crude reaction product was heated to 80° C. in vacuo on a rotary evaporator and then partially distilled on a spinning band to bring most of the remaining unreacted nonene and p-methoxyphenol overhead. In this case the pot and column temperature were taken up to 150° C. at 3 mm. The resulting product in the pot (Product A) was analyzed. The composition is shown in Table 1.

EXAMPLE 2 p-methoxyphenol (250 g, 2.014 mole) was charged to a 1 liter 3-neck flask equipped with a mechanical stirrer, gas inlet tube, condenser, and heating mantle. The flask was heated to melt the p-methoxyphenol and then a total of 11 g of boron trifluoride gas was introduced into the melted p-methoxyphenol. The gas inlet tube was removed and replaced with an addition funnel and thermometer. Nonene (305 g, 2.416 mole) was added dropwise from an addition funnel to the stirred reaction mixture maintained at 45°-55° C. over 3 hr. After this addition, the reaction mixture was stirred an additional 30 minutes.

The resulting reaction mixture was cooled and poured into 250 ml of deionized water. Ether (200 ml) was added to extract the product. The resulting ether extract was washed a second time with water (250 ml) and then with water (250 ml) plus sufficient caustic to bring the pH to 10. Finally, the ether extract was washed with saturated sodium chloride solution and then dried over anhydrous sodium sulfate. The resulting crude product was concentrated in vacuo on a rotary evaporator first at ~35 mm and 60° C. and then at 1-22 mm and up to 160° C. to remove most of the unreacted nonene and p-methoxyphenol. The resulting product (Product B) was analyzed. The composition is shown in Table 1.

EXAMPLE 3

This product was prepared in a manner similar to that of Example 2 using 100 g (0.805 mole) of p-methoxyphenol, 2.1 g of boron trifluoride, and 203 g (1.608 mole) of nonene. The nonene was added dropwise over 5.5 hr to the stirred mixture of p-methoxyphenol and boron trifluoride that was maintained at 40°-55° C. during the addition. After workup the crude reaction product was heated in vacuo on a rotary evaporator first at ~35 mm and 80° C. and then at 1 mm and 140° C. until no further weight loss was observed. The resulting product (Product C) weighed 242.6 g. It had the composition shown in Table 1.

EXAMPLE 4

A portion (100.46 g) of Product B was distilled on a spinning band column. One pellet of sodium hydroxide was added to the distillation flask prior to starting the distillation. Several cuts were taken boiling in the range 90°-182° C. at 7-9 mm. A smoke or vapor was noticeable in the overhead portion of the distillation unit during the fractionation suggesting some denonylation probably occurred. Four cuts boiling in the range 133°-182° C. at 7-9 mm were combined to give a clear and relatively viscous liquid; this material (Product D) had the composition shown in Table 1.

EXAMPLE 5

This product was prepared in a manner similar to that of Example 2 using 500 g (4.027 mole) of p-methoxyphenol, 1016 g (8.05 mole) of nonene, and 14.75 g of boron trifluoride. The nonene was added dropwise from an addition funnel over 6 hours while the reaction mixture was maintained at 40°-50° C. After workup the crude product was heated on a rotary evaporator first at ~35 mm and 80° C. and then at 1-2 mm and 140° C. for 1 hour. The resulting reddish-brown product (Product E) had the composition shown in Table 1.

TABLE 1
COMPOSITION OF NONYLATED p-METHOXYPHENOL PRODUCTS

| Product | w/o Nonene | w/o$_a$ MP | w/o$_b$ M-MP | w/o$_c$ D-MP | Catalyst |
|---|---|---|---|---|---|
| A | 2.8 | 6.8 | 68.9 | 21.5 | $H_2SO_4$ |
| B[d] | 2.7 | 1.2 | 60.8 | 35.3 | $BF_3$ |
| C[d,e] | 2.1 | 0.7 | 29.6 | 66.8 | $BF_3$ |
| D[d,f] | 0.7 | 0 | 97.4 | 1.9 | $BF_3$ |
| E[d,e] | 1.1 | 0.1 | 27.8 | 69.6 | $BF_3$ |

[a] w/o MP = weight percent of p-methoxyphenol in the sample.
[b] w/o M-MP = weight percent of mononylated p-methoxyphenol in the sample.
[c] w/o D-MP = weight percent of dinonylated p-methoxyphenol in the sample.
[d] These products were shown by fluoride analysis to contain no significant levels of residual $BF_3$. The fluoride levels in these products were ≦3 ppm, which value is essentially a backround level.
[e] These products contained a small amount of an unknown component. The level of this unknown component was 0.8 w/o in Product C and 1.4 w/o in Product F.
[f] This product was the only distilled one. All the others were bottoms products which resulted after most of the unreacted nonene and p-methoxyphenol was distilled overhead.

EXAMPLE 6

This example shows the effectiveness of the nonylated p-methoxyphenol products as free radical inhibitors (i.e. shortstoppers) in the preparation of polyvinyl chloride.

A standard PVC polymerization was run at 57° C. using the following materials in the amounts stated.

| | |
|---|---|
| Deionized water | 16.2 kg. |
| Suspending agent (b) | 0.083 phm (a) |
| Initiator (c) | 0.075 phm (a) |
| Vinyl chloride monomer (VCM) | 9 kg. |

(a) part per hundred parts of monomer
(b) Hydroxypropyl methylcellulose
(c) di(2-ethylhexyl) peroxydicarbonate The materials were added to an 8-gallon jacketed reaction vessel. The polymerization began immediately. When the desired degree of polymerization had taken place (~85 percent as measured by a pressure drop to 90 psig) 0.033 phm of Product A was flushed into the reactor with water so as not to introduce gas ($N_2$ or air) into the reactor. The temperature of the sealed reactor was increased to 180° F. and maintained one hour. The effectiveness of the shortstopper was determined by the difference in reactor pressure at initial heating at 180° F. and after one hour. If polymerization was not stopped, i.e., the free radicals were not killed, a large difference in pressure was seen. This is due to decreased VCM level in the reactor from further polymerization. The lower the pressure differences the more effective the shortstopper was.

Runs were repeated using 0.055 phm of Product A, and 0.033 and 0.055 phm of Products B, C, D and E.

The results of the tests are shown in Table 2.

EVALUATION OF NONYLATED p-METHOXYPHENOL PRODUCTS AS SHORTSTOPPING AGENTS

| Product | Shortstopper[a] phm | psig[b] |
|---|---|---|
| A | 0.033 | 4 |
| A | 0.055 | 2 |
| B | 0.033 | 3 |
| B | 0.055 | 5 |
| C | 0.033 | 2 |
| C | 0.055 | 1 |
| D | 0.033 | 4 |
| D | 0.055 | 2 |
| E | 0.033 | 4 |
| E | 0.055 | 2 |
| AMS[c] | 0.039 | 12 |
| AMS[c] | 0.055 | 7 |

[a] phm = parts per hundred weight of monomer (VCM).
[b] At 90 psig, the experimental killing agent was added into the reactor. The reactor temperature was increased to 180° F. and maintained one hour. The values shown are the difference between the reactor pressure when the temperature first reached 180° F. and after one hour. If polymerization continued (the reaction was not killed), the values would be in the neighborhood of 20.
[c] AMS = α-methylstyrene

EXAMPLE 7

This example illustrates the effectiveness of the various nonylated p-methoxyphenol products of Examples 1–5 as antioxidants by the use of the mill heat stability test.

A standard PVC polymerization was run at 57° C. in a 50 gallon reactor using the following formulation in the amounts stated:

| | |
|---|---|
| Deionized water | 81 kg. |
| Suspending agent (b) | 0.05 phm (a) |
| Initiator (c) | 0.069 phm (a) |
| Vinyl chloride monomer | 54 kg. |

(a) parts per hundred parts of monomer
(b) Hydroxypropyl methylcellulose
(c) di(2-ethylhexyl) peroxydicarbonate The materials were added to a 50 gallon jacketed reaction vessel. The polymerization began immediately. When the desired degree of polymerization had taken place (~85 percent conversion of VCM to PVC as measured by a pressure drop to 90 psig) a measured amount of one of the nonylated p-methoxyphenol products was added as in Example 6. The unreacted VCM was vented from the reactor and the PVC slurry was steam stripped to remove residual VCM, centrifuged and the wet cake was oven dried. Runs were made on Products A, B, C and E at levels of 0.037 and 0.073 phm. In the 0.037 runs a commercial shortstopper (α-methylstyrene) was added at the same level. For comparison, one run was made using 0.037 phm of α-methylstyrene and 0.037 phm of dinonyl-o-cresol.

The heat stability of the PVC resin product was measured by preparing a mill blend consisting of the following recipe:

| | |
|---|---|
| PVC Resin | 300 grams |
| Commercial Processing Aid | 9 grams |
| Wax | 1.5 grams |
| Calcium Stearate | 2.4 grams |
| Methyl tin mercaptide stabilizer | .91 grams |

The blend was placed on a heated 2 roll mill at about 385° C. Chips were removed from the mixture at 1 minute intervals beginning when the blend first banded on the mill. The test was stopped when the mill sheets turned reddish brown indicating severe degradation. All resins tested were compared to specially prepared control resin having no stabilizer added, by comparing the color of the resin chips to the 3 and 6 minute chips of the control resin. The values in the 3 and 6 columns of Table 3 show the times on the mill for the resin prepared with the PVC stabilizer to reach equal color as the control resin at 3 and 6 minutes. The larger the value the more stable the resin was and conversely, the smaller the value the less stable the resin.

TABLE 3

EVALUATION OF NONYLATED p-METHOXYPHENOL PRODUCTS AS PVC ANTIOXIDANTS BY A MILL HEAT STABILITY STUDY

| Product | Antioxidant phm[a] | AMS phm[a] | MILL HEAT STABILITY[b] 3 | 6 |
|---|---|---|---|---|
| A | 0.037 | 0.037 | 3 | 6 |
| A | 0.073 | — | 3 | 6 |
| B | 0.037 | 0.037 | 3 | 6 |
| B | 0.073 | — | 3 | 6 |
| C | 0.037 | 0.037 | 3 | 6.5 |
| C | 0.073 | — | 3 | 6 |
| E | 0.037 | 0.037 | 3 | 6 |
| E | 0.073 | — | 3 | 6 |
| Comparative Run | 0.037 | 0.037 | 3 | 6 |

[a] phm = parts per hundred weight of monomer (VCM).
[b] Numbers under the 3 and 6 column show a comparison of early and late color to those obtained with the current standard resin. A 3 and 6 shows equal early and late color to the standard resin. A 6.5 shows somewhat better late color than the standard. The standard resin is a specially prepared resin used as a control for all experimental test data. The same standard resin is used regardless of what test is being run.

As shown in Table 3, all of the PVC products prepared with a nonylated p-methoxyphenol as antioxidant gave equal results to the standard PVC resin and to the PVC resin prepared with dinonyl-o-cresol and α-methylstyrene with the exception of one product. The PVC product prepared with nonylated p-methoxyphenol Product C gave somewhat better late heat stability (6.5) than either the standard resin (6) or the resin prepared with equal weights of dinonyl-o-cresol and α-methylstyrene (6). Overall, the results in Table 3 indicate that the nonylated p-methoxyphenol is as effective as, or even slightly better, than dinonyl-o-cresol, which is used commercially in substantial amounts, on an equal weight basis. Earlier work has shown that dinonyl-o-cresol is as effective as butylated hydroxytoluene (another commercial antioxidant) in stabilizing PVC resin.

Thus, having described the invention in detail, it will be understood by those skilled in the art that certain variations and modifications may be made without departing from the spirit and scope of the invention as defined herein and in the appended claims.

We claim:

1. An improvement in the method of terminating the polymerization of vinyl halide-containing polymers, wherein the improvement comprises:
   injecting a free radical inhibitor, obtained by the alkylation of P-methoxyphenol with nonene, into the polymerization reactor when the level of conversion of monomer to polymer is in the range of 75 to 90%, said inhibitor being injected in an effective amount in the range of about 0.01 to about 0.10 parts per hundred parts of monomer.

2. The improved method of claim 1 wherein the monomer, used to prepare the vinyl halide-containing polymer, is vinyl chloride.

3. The improved method of claim 2 wherein the free radical inhibitor is the bottoms product remaining after distilling the reaction product to removing substantially all unreacted nonene and unreacted p-methoxyphenol.

4. The improved method of claims 1, 2 or 3 wherein the alkylation of p-methoxyphenol with nonene is conducted under the following conditions:
   (a) about 0.7 to about 4 parts by weight of nonene per part of p-methoxyphenol,
   (b) about 0.5 to about 7 weight percent of alkylation catalyst per part of p-methoxyphenol,
   (c) a temperature in the range of about 25 to about 150° C., and
   (d) a reaction time in the range of about 1 to about 24 hours.

5. The improved method of claim 4 wherein the alkylation catalyst is aluminum chloride.

6. The improved method of claim 4 wherein the alkylation catalyst is boron trifluoride.

7. The improved method of claim 5 wherein the nonene is prepared by trimerization of propylene.

8. The improved method of claim 6 wherein the nonene is prepared by trimerization of propylene.

9. The improved method of claim 1 wherein the amount of free radical inhibitor is in the range of about 0.02 to about 0.04 parts per hundred parts of monomer.

10. The improved method of claim 9 wherein the monomer is vinyl chloride.

11. The improved method of claim 10 wherein the free radical inhibitor is the bottoms product remaining after distilling the reaction product to removing substantially all unreacted nonene and unreacted p-methoxyphenol.

12. The improved method of claims 9, 10, or 11 wherein the alkylation of p-methoxyphenol with nonene is conducted under the following conditions:
   (a) the alkylation catalyst is aluminum chloride or boron trifluoride,
   (b) about 1 to about 2.2 parts by weight of nonene per part of p-methoxyphenol,
   (c) about 1 to about 4 weight percent of alkylation catalyst per part of p-methoxyphenol,
   (d) a temperature in the range of about 40° to about 95° C., and
   (e) a reaction time in the range of about 3 to about 12 hours.

13. The improved method of claim 12 wherein the alkylation catalyst is boron trifluoride.

14. The improved method of claim 13 wherein the nonene is prepared by trimerization of propylene.

* * * * *